United States Patent [19]

Murphy et al.

[11] Patent Number: 5,329,529
[45] Date of Patent: Jul. 12, 1994

[54] DIGITAL DATA ARBITRATION APPARATUS

[75] Inventors: Peter M. Murphy, Carmel; Gregory G. Tamer, Indianapolis, both of Ind.

[73] Assignee: Thomson Consumer Electronics, Inc., Indianapolis, Ind.

[21] Appl. No.: 42,179

[22] Filed: Apr. 2, 1993

[51] Int. Cl.⁵ .............................. H04J 3/02
[52] U.S. Cl. ................... 370/85.6; 370/112; 307/243
[58] Field of Search ............ 370/84, 85.6, 85.7, 370/111, 112; 307/239, 243; 328/104

[56] References Cited

U.S. PATENT DOCUMENTS

| | | | |
|---|---|---|---|
| 3,781,818 | 12/1973 | Pardoe et al. | 370/111 |
| 3,838,296 | 9/1974 | McLeod | 370/112 |
| 5,111,455 | 5/1992 | Neaus | 370/112 |

*Primary Examiner*—Benedict V. Safourek
*Attorney, Agent, or Firm*—Joseph S. Tripoli; Eric P. Herrmann; Ronald H. Kurdyla

[57] ABSTRACT

A data arbitration apparatus for combining data from a plurality of data paths, wherein data from the respective data paths are clocked by respective clock signals asynchronously and at different rates includes a multiplexer to which the respective data paths are coupled. The output of the multiplexer is applied to a "D"-type register having a dock input terminal coupled to one of the respective clock signals. The D-type register provides the combined data signal. A logic arrangement is coupled to the respective clock signals for providing control signals according to a hierarchy of importance of the signals occurring on the respective data paths. The control signals are coupled to condition the multiplexer to provide data samples from the respective data paths according to the established hierarchy. The logic arrangement is constructed such that the multiplexer switches to a different data path on a predetermined transition of the clock signal for that data path and switches back to the prior connected data path on the next predetermined transition of the clock signal associated with such prior connected data path.

9 Claims, 2 Drawing Sheets

DIGITAL DATA ARBITRATION APPARATUS

This invention relates to apparatus for combining digital dam from multiple sources into a single dam stream.

BACKGROUND OF THE INVENTION

Often it is necessary or desirable to coalesce non-synchronous data from different data sources into a single data stream, with samples in the combined data stream occurring at a constant rate. For example, in formatting compressed video data according to a particular protocol, a state machine may be employed to control the formatting of such data. Depending upon system exigencies, it may become necessary to re-establish the current state of operation of the state machine. This may be accomplished by inserting a particular codeword into the input data stream that the state machine is processing. The particular codeword may be provided by a system microprocessor controller which is operating asynchronously with the data being input to the formatter.

SUMMARY OF THE INVENTION

The present invention is a data arbitration apparatus for combining data from a plurality of data paths, wherein data from the respective data paths are clocked by respective clock signals asynchronously and at different rates. The respective data paths are coupled to respective input ports of a multiplexer. The output of the multiplexer is applied to a "D"-type register having a clock input terminal coupled to one of the respective clock signals. The D-type register provides the combined data signal.

A logic arrangement is coupled to the respective clock signals for providing control signals according to a hierarchy of importance of the respective data paths. The control signals are coupled to condition the multiplexer to provide data samples from the respective data paths according to the established hierarchy. The logic arrangement is constructed such that the multiplexer switches to a different data path on a predetermined transition of the clock signal for that data path and switches back to the prior connected data path on the next predetermined transition of the clock signal associated with such prior connected data path.

DETAILED DESCRIPTION

Figure 1:
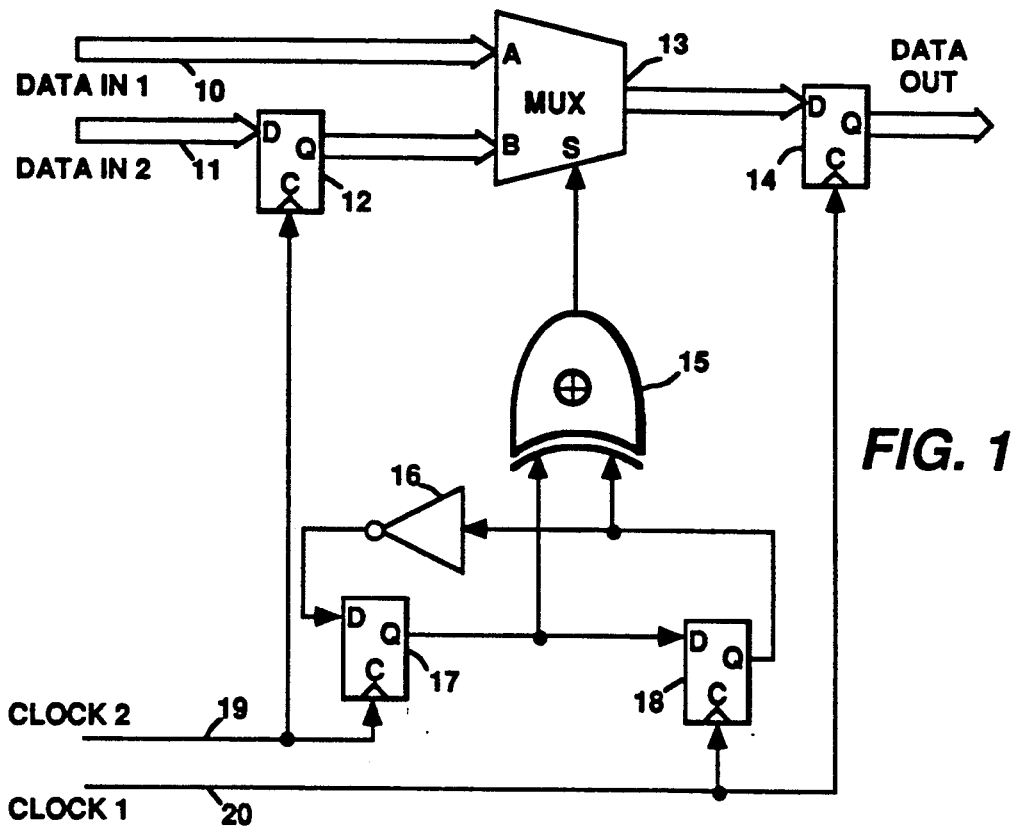
FIGS. 1, 3 and 4 are block diagrams of data arbitration apparatus embodying the present invention.
Figure 2:
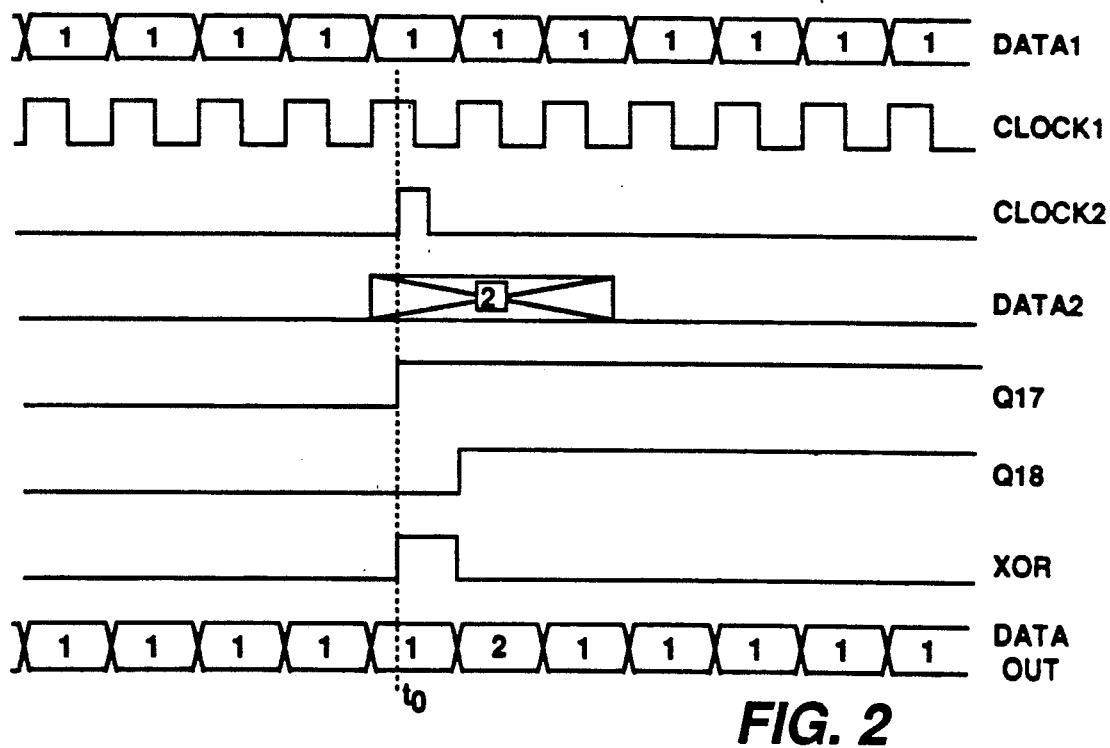
FIG. 2 are system waveforms useful in describing the invention.

Referring to FIGS. 1 and 2, a first data signal "DATA IN 1", hereafter Data1, occurring at a sample rate determined by a clock signal CLOCK 1, is applied to a first input port 10, of a multiplexer 13. A second data signal "DATA IN 2", hereafter Data2, occurring at a sample rate determined by a further clock signal CLOCK 2, is applied to the data input port 11, of a D-type latch or register 12, the output of which is coupled to a second input port of the multiplexer 13. The output data provided by the multiplexer is coupled to the data input port of a D-type latch or register 14. Register 14 provides the selectively combined output signal.

In this example the signal Data2 has priority over the signal Data1, and occurs sporadically. The clock signal CLOCK 2 is assumed to provide enable pulses which are of narrower duration than a period of the clock signal CLOCK 1 and which occur during the presence of datawords of the signal Data2. As such the majority of data to be processed occurs in the signal Data1. The respective signals Data1, Data2, CLOCK 1 and CLOCK 2 are illustrated as liked named waveforms in FIG. 2.

The D-type latches are of the type which load and store new data present at their respective "D" or data input ports immediately prior to the application of a rising transition of a clock signal applied to their respective "C" or clock input terminals. Note in this example the data samples of Data1 and Data2 are assumed to be parallel-bit data samples, and the latches 12 and 14 are assumed to be a like plurality of parallel one-bit devices. Samples of signal Data2 are latched into latch 12 on the rising or leading transitions of the signal CLOCK 2. Samples provided by the multiplexer 13 are latched into the latch 14 on the rising or leading transitions of the signal CLOCK 1.

The multiplexer 13 is conditioned by an XOR circuit 15 to normally pass the signal Data1, and on the occurrence of a pulse of the signal CLOCK 2 to pass the signal Data2. Note that the element 15 may be an XOR or an XNOR without having any affect on the system operation, so long as the input samples are applied to the multiplexer input ports so that the multiplexer will normally pass the signal Data1.

First and second single-bit D-type latches 17 and 18 are coupled in cascade with the "Q" output port of the latch 17 connected to the "D" input port of the latch 18. The "Q" output port of the latch 18 is coupled to the "D" input port of the latch 17 via an invertor 16. The clock signal CLOCK 2 is applied to the clock input terminal of the latch 17 and the clock signal CLOCK 1 is applied to the clock input terminal of the latch 18. The "Q" output terminals of the latches 17 and 18 are connected to respective input terminals of the XOR gate 15.

Given the foregoing conditions, new data is clocked into latch 17 infrequently relative to the clock rate of the clock signal CLOCK 1. Hence assuming that the latch 17 is storing a logic zero prior to the time $t_o$, this logic zero will be repetitively clocked into the latch 18 by respective pulses of the clock signal CLOCK 1 applied to latch 18. Therefore both latches 17 and 18 will be exhibiting the same output state prior to time $t_o$, and the XOR 15 will exhibit a logic zero output state, which logic zero output state conditions the multiplexer 13 to pass Data1. At time $t_o$, a pulse of clock signal CLOCK 2 occurs concurrently with a sample of the signal Data2. The leading transition of the pulse of CLOCK 2 loads the inverted output from latch 18 into latch 17. From the leading transition of CLOCK 2 until the next leading transition of CLOCK 1 (when the changed output of latch 17 is loaded into latch 18) the two latches 17 and 18 will exhibit different output states and the XOR gate will exhibit a logic one output state. This logic one output state conditions the multiplexer 13 to pass the signal Data2. Immediately following the next transition of CLOCK 1 the latches 17 and 18 will again exhibit like output states (both logic high), the XOR will exhibit a logic zero and the multiplexer will be again conditioned to pass the signal Data1. The selectively combined output data signal is illustrated as "DATA OUT" in FIG. 2.

It is seen that the output data, "DATA OUT", provided from the latch 14, is synchronous with the majority signal Data1, but that the signal Data2 always takes priority.

Figure 3:
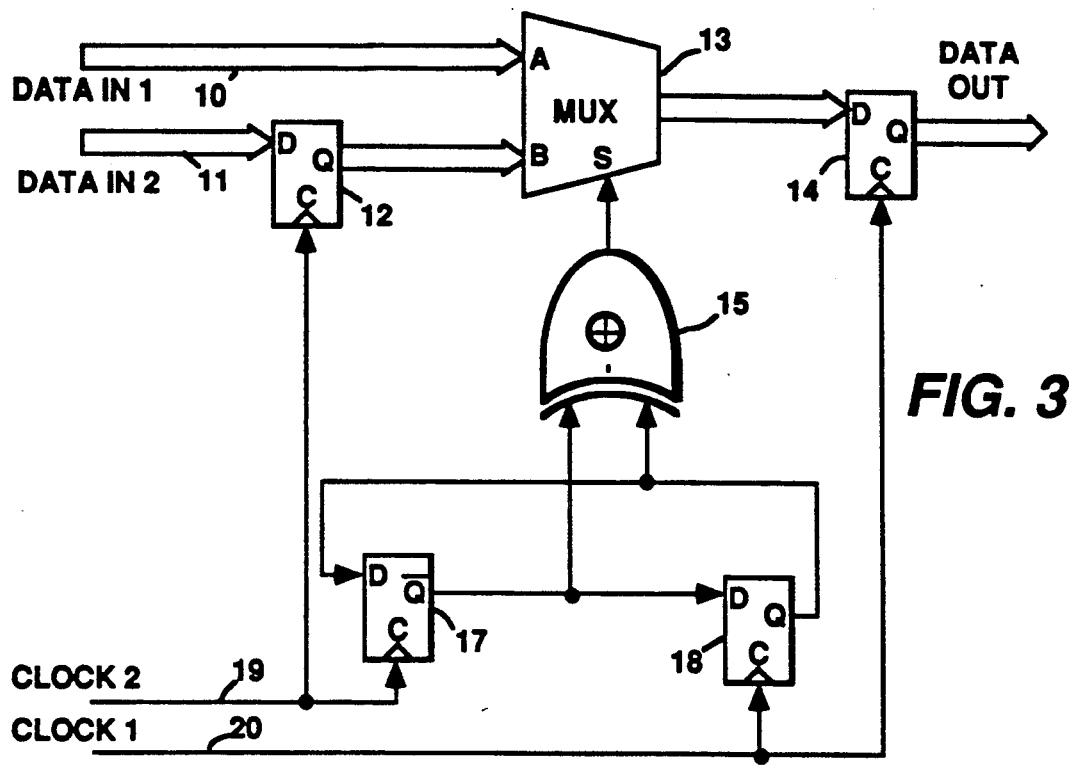

FIG. 3 is a variant of the FIG. 1 arrangement, but which operates in similar fashion and according to the waveforms of FIG. 2. The only structural differences are that the invertor 16 of FIG. 1 has been eliminated and its function provided by coupling the "Q" output (rather than the "Q" output) of the latch 17 to the "D" input of the latch 18, and one of the input terminals of the XOR 15.

Figure 4:
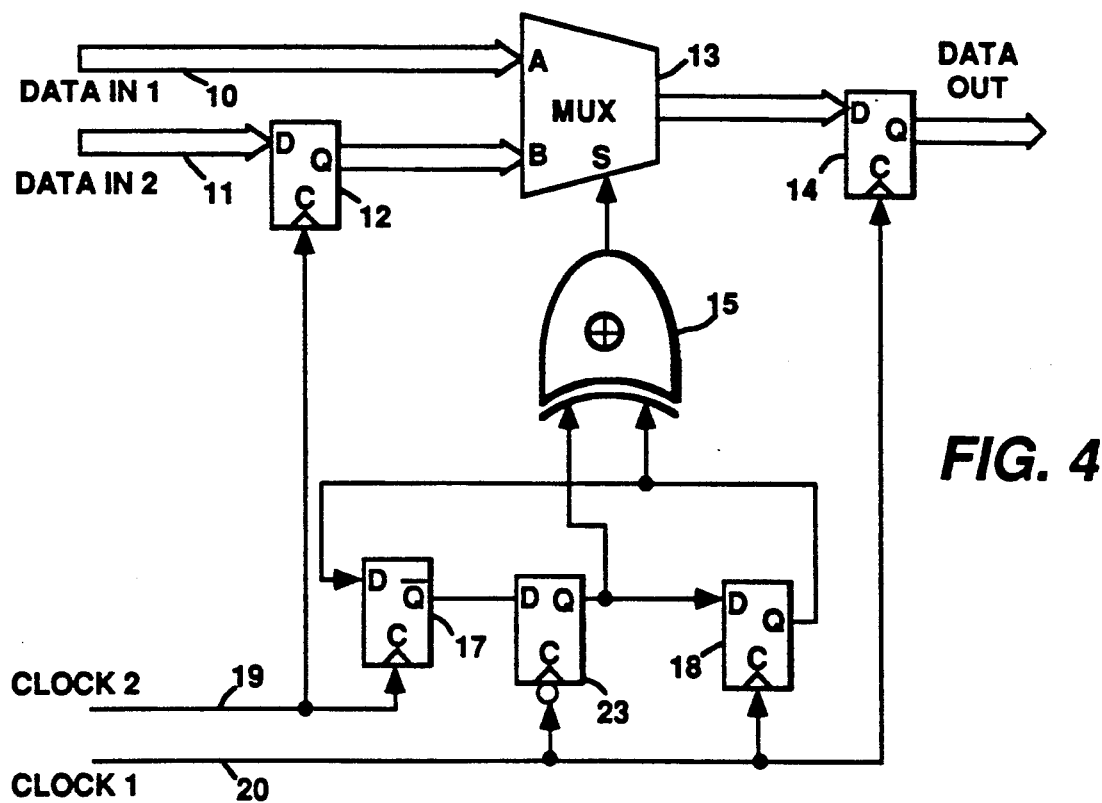

FIG. 4 is a further variant, similar to FIG. 3. However in FIG. 4 an additional latch, 23, is coupled between latches 17 and 18. The latch 23 is arranged to latch new data on the falling or trailing transitions of the clock signal CLOCK 1. Adding the latch 23 insures that the XOR exhibits a logic one output for one half of the period of CLOCK 1, to eliminate race conditions. This arrangement however, requires that samples of the signal Data2 be of duration at least equal to one and one half the period of the signal CLOCK 1.

Alternative arrangements are possible to prevent race conditions. For example, in the FIG. 4 circuitry, the latch 23 may be replaced with an RC circuit. That is a series resistance may be connected between the output of the latch 17 and the input of the latch 18, and a shunt capacitance coupled between the input of the latch 18 and a point of fixed potential. The XOR input connection will be connected at the resistance-capacitance interconnection. The time constant of the RC elements will be selected to be greater than the transit time of data from latch 12 through multiplexer 13 to the input of the latch 14.

A further alternative arrangement relative to the FIG. 3 circuitry is to use a transparent latch for latch 17. What is meant by a transparent latch is one which passes data applied to its data input port to its output connection for the duration that a clock or enable signal is applied, and thereafter latches the data applied to its input terminal immediately prior to the clock or enable signal being removed. Latches of the type MM74HC75 produced by National Semiconductor of Santa Clara, Calif. are suitable for this application. Note however, to use transparent latches to obviate race conditions, in this situation, requires that the pulses of the signal CLOCK 2 be of wider duration than one period of the signal CLOCK 1.

What is claimed is:

1. Apparatus for selectively non-additively combining data signals from separate data paths, wherein the data signals from the respective data paths occur at different sample rates determined by respective associated clock signals and are non-synchronous, said apparatus comprising:
   first and second data paths for providing said separate data signals;
   a source of first and second clock signals respectively associated with sampled signals available on said first and second data paths;
   a multiplexer having a first input port coupled to said first data path, having a second input port, a control input port and an output port;
   first and second latches having respective data input ports, respective output ports and respective clock input ports, said first latch having its input port coupled to said second data path, its output port coupled to the second input port of said multiplexer and its clock input port coupled to receive said second clock signal, said second latch providing said non-additively combined data signal, having its input port coupled to the output port of said multiplexer, and its clock input port coupled to receive said first clock signal;
   third and fourth latch means having respective input and output terminals respectively coupled to the output and input terminals of said fourth and third latch means, said third and fourth latch means having respective clock input terminals coupled to receive said first and second clock signals; and
   logic means coupled to the respective output terminals of said first and second latch means for providing a control signal to said control input port for conditioning said multiplexer to pass data signal from said second data path on the occurrence of clock pulses of said second clock signal and to pass data signal from said first data path otherwise.

2. The apparatus set forth in claim 1 wherein said logic means comprises an exclusive OR circuit having first and second input terminals coupled respectively to the output terminals of said third and fourth latch means.

3. The apparatus set forth in claim 1 wherein said logic means comprises an exclusive NOR circuit having first and second input terminals coupled respectively to the output terminals of said third and fourth latch means.

4. The apparatus set forth in claim 1 wherein said third and fourth latch means are D-type latches, and the output terminal of said third latch means provides an inverted output signal to the input terminal of said fourth latch means.

5. The apparatus set forth in claim 1 wherein said third and fourth latch means are D-type latches, and the output terminals of said third and fourth latch means correspond to Q output terminals, and wherein said output terminal of the fourth latch means is coupled to the input terminal of said third latch means by a logic invertor.

6. The apparatus set forth in claim 2 wherein said third and fourth latch means are D-type latches, and the output terminals of said third and fourth latch means correspond to Q output terminals, and wherein said output terminal of the fourth latch means is coupled to the input terminal of said third latch means by a logic invertor.

7. Apparatus for selectively multiplexing first and second data signals from separate data paths, wherein the first and second data signals from the respective data paths occur at different sample rates determined by respective associated first and second clock signals and are non-synchronous, said apparatus comprising:
   first and second data paths for providing said first and second data signals;
   a source of said first and second clock signals respectively associated with said first and second data signals available on said first and second data paths;
   a multiplexer having a first input port coupled to said first data path, a second input port coupled to said second data path, a control input port and an output port;
   means coupled to the output port of said multiplexer and responsive to said first clock signal, for sampling signal provided by said multiplexer synchronous with said first clock signal; and logic means coupled to receive said first and second clock signals and responsive to said second clock signal for initiating generation of a control signal, and responsive to said first clock signal for terminating generation of said control signal, and wherein said control signal is coupled to the control input port of said multiplexer for conditioning said multiplexer to pass data from said second data path on the occurrence of a pulse of said second clock signal, and to pass data from said first data path otherwise.

8. The apparatus set forth in claim 7 wherein said logic means comprises:

first and second latch means having respective input and output terminals coupled respectively to the output and input terminals of said second and first latch means, said first and second latch means having respective clock input terminals coupled to receive said second and first clock signals; and means coupled to the respective output terminals of said first and second latch means for providing a control signal to said control input port, for conditioning said multiplexer to pass data signal from said second data path on the occurrence of clock pulses of said second clock signal and to pass data signal from said first data path otherwise.

9. The apparatus set forth in claim 8 wherein said means for providing a control signal comprises an exclusive OR circuit having first and second input terminals coupled respectively to the output terminals of the first and second latch means.

* * * * *